March 31, 1970  J. H. ROBERSON ET AL  3,504,095
SHIELDING GASKETS
Filed Jan. 30, 1968

INVENTORS
J. HARVEY ROBERSON,
EDWARD B. PRICE,
BY
ATTORNEYS

United States Patent Office

3,504,095
Patented Mar. 31, 1970

3,504,095
SHIELDING GASKETS
James Harvey Roberson and Edward B. Price, West Caldwell, N.J., assignors to Instrument Specialties Company, Inc., West Paterson, N.J., a corporation of New Jersey
Filed Jan. 30, 1968, Ser. No. 701,784
Int. Cl. F16j *15/08;* H05k *9/00*
U.S. Cl. 174—35                                7 Claims

ABSTRACT OF THE DISCLOSURE

A shielding gasket to be mounted in a door or joint of electical apparatus for the purpose of isolating the electromagnetic environments between the mating surfaces. The gasket is formed of sheet metal of electrical conducting material having an adhesively coated longitudinal attaching section which supports one end of transverse fingers, the fingers being bent backward over the attaching section with a bridging section which makes contact at both ends and the middle with the mounting surface and the mating surface of the joint, respectively.

---

This invention relates to improvements in shielding gaskets to be used in fixed or movable joints in shielded structures, such as test rooms and enclosures for radio transmitters, radio receivers, computers, and other equipment requiring electronic shielding.

Such structures usually are provided with movable joints which occur at doors, access panels, drawers and other non-fixed portions of the structures. Fixed joints may also involve permanent connections, attached panels and other connections which are not readily movable. It is desirable to seal these joints effectively with conductive surfaces that will permit isolation of electromagnetic fields and so shield the components contained therein.

Various attempts have been propose heretofore for shielding at such fixed and movable joints, but these have not been sufficiently secure so as to maintain the highest standards of attenuation of good electric contact between the opposed surfaces, especially in joints where the direction of closure may be both approximately perpendicular and parallel to the surfaces to which the gasket is attached, as in closing a hinged door.

One form of electronic gasket used heretofore is set forth in Patent No. 3,277,230, granted Oct. 4, 1966. That form of gasket is subject to damage from accidental contact and requires fasteners for attaching the gasket to a mounting surface of the joint. Moreover, the width of the gasket requires substantial area due to the lateral extent of the fingers forming the gasket.

One object of this invention is to improve the shielding effect obtained with gaskets that are employed in joints between fixed and nonfixed portions of structures and to avoid exposed projections leading to accidental damage.

Another object of the invention is to increase the effectiveness of the gasket as the latter is compressed, to obtain a high dynamic range, long endurance life, good attenuation at light pressures and excellent attenuation when fully compressed, and to reduce the labor for installation.

Still another object of the invention is to improve the mounting of the gasket on one of the opposed surfaces so as to permit free motion of the contacting portions of the gasket during compression and to provide for substantially full compression without interference by a fastener between the opposed surfaces to any appreciable extent.

These objects may be accomplished, according to one embodiment of the invention, by forming the gasket of a strip of elastic metal having transverse fingers extending in bowed relation over an attaching portion of the strip, which fingers are in positions to bear yieldably in the bowed areas thereof and at the tips and reverse bends of the fingers against a mounting surface. The attaching portion of the strip lies intermediate the ends of the fingers free of the tips thereof and has means for securing the gasket to a mounting surface. It is preferred that an adhesive strip be used for this purpose having a suitable tacky adhesive which may be pressed against the mounting surface of the joint. The relative movement between the opposed surfaces of the joint will apply repeated application of force to the tacky surface of the adhesive, thereby continually maintaining the attachment of the gasket to the supporting surface.

This embodiment of the invention is illustrated in the accompanying drawing, in which.

The invention is illustrated as applied to a joint formed by a pair of members 1 and 2 of a metallic enclosure, between opposed surfaces *a* and *b* thereof.

These members 1 and 2 have opposed surfaces *a* and *b* between which a shielding gasket or gaskets may be disposed for effecting an electromagnetic shielding of the enclosure. One of the parts may be movable relative to the other, as, for example, a door, access panel, drawer, etc. On the other hand, the parts may be fixed, as in a permanent joint or one secured by adequate fastenings which may or may not be readily removable.

Mounted between the opposed surfaces *a* and *b* of the parts 1 and 2 is a gasket or gaskets 3 each preferably formed of a linear strip of thin metal of good spring properties and good conductivity. It has been found that a beryllium copper alloy is satisfactory for this purpose. The gasket usually extends in a straight line.

The gasket 3 is formed initially from a flat strip of metal of the character described and of a width suitable for the surface to be shielded. The gasket should extend throughout substantially the entire length of the joint and may be overlapped at corners for shielding continuity.

Figure 1:
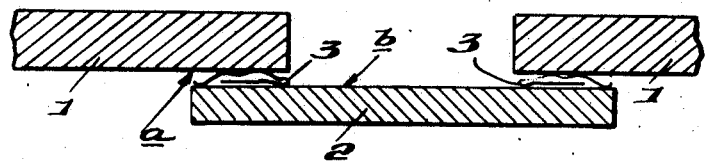
FIG. 1 is a sectional view through a movable joint, having a gasket in place between the parts thereof.
Figure 2:
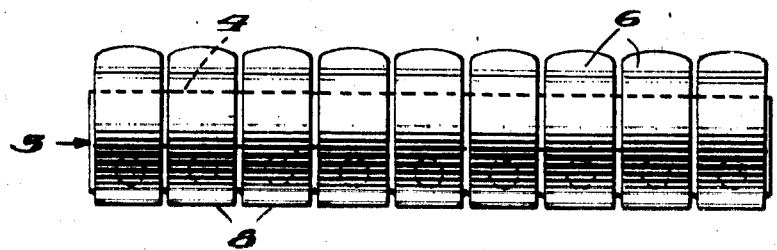
FIG. 2 is a plan view of an electronic gasket embodying this invention.
Figure 3:
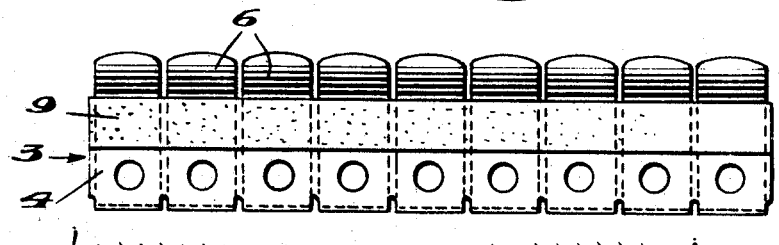
FIG. 3 is a similar view from the opposite side thereof.
Figure 4:
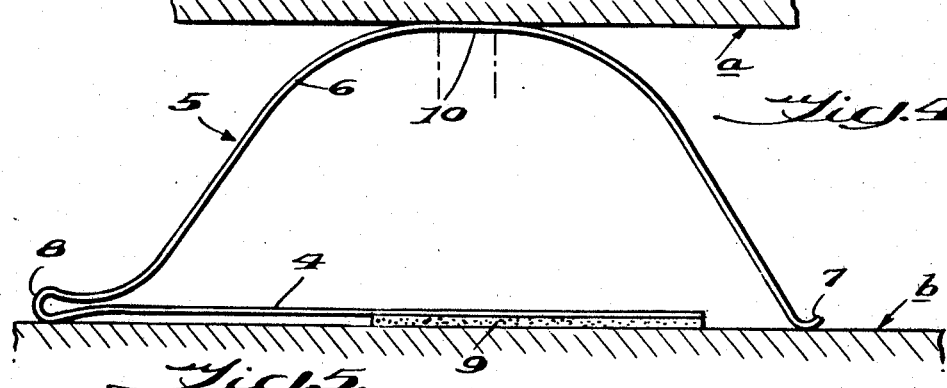
FIG. 4 is an enlarged end elevation of the gasket in its free position.
Figure 5:
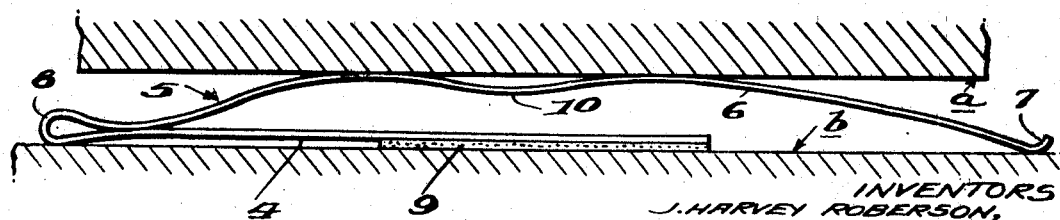
FIG. 5 is a similar view thereof in its compressed position.

The gasket is made of a flat strip of metal of the character described, with fingers folded laterally across a longitudinally attaching portion 4 to provide a bearing portion 5. The strip is notched substantially throughout the width of the portion 5 to form a row of integral fingers 6 which are bowed so as to have bearing contact against a mating surface of the joint, which surface is indicated at *a* in FIG. 4. The ends of the fingers 6 are turned outward and upward at 7 for rubbing contact with the opposite or mounting surface *b* of the joint.

The attaching portion 4 is connected with the bearing portion 5 through a reverse bend 8 which not only adds resilience to the spring finger 6 and protects the reverse bend from overstress, but this reverse bend portion is turned downward so as to bear directly upon the mounting surface *b* and thus make electrical contact therewith.

The attaching portion 4 is connected with the mounting surface *b* of the joint by suitable means such, for example, as a strip of double adhesive transfer tape 9 extending lengthwise of the free edge of the portion 4 with the width of the tape sufficiently narrow to be adequately spaced from the reverse bend 8, if so desired. This adhesive attaching means may extend either partway or wholly throughout the width of the attaching portion 4.

The free edge of the attaching portion 4 is spaced from the bearing portions 7 of the fingers 6 so as to permit freedom of movement of the fingers relative thereto and without coming into contact with the portion 4, but the portions 7 and 8 bear upon the mounting surface *b* of the joint and make electrical contact therewith while the bowed portions of the fingers 6 bear against the mating surface *a* of the joint at a point approximately opposite the adhesive portion of the attaching strip 9. Thus, the opening and closing of the joint will reapply pressure to the adhesive surface and continually cause sufficient application of force thereby against the connected surface of the joint so as to maintain the adhesive connection.

Each of the fingers 6 has a flat portion 10 in the center of the arch formed by the bowed fingers, which flat portion 10 forms the bearing surface of the finger. These flat portions of the fingers provide increased endurance life for the gasket.

At the same time the contact of the portions 7 and 8 with one surface of the joint and the bowed portions of the fingers with the opposite surface of the joint will give a short circuit through the springs of the electromagnetic fields of the surfaces.

This construction is not only inexpensive to manufacture, but it provides an effective shielding gasket which takes very little space in the joint. The wiping contact provided by the fingers with the surfaces of the joint is effective in sealing the joint and providing an effective sealing means therein very simply and readily. There are no prominent projections to catch clothing and cause accidental damage.

While the invention has been illustrated and described in one embodiment, it is recognized that variations and changes may be made therein without departing from the invention as disclosed.

We claim:

1. As an article of manufacture, an electromagnetic shielding gasket comprising a linear metallic strip having an attaching portion extending lengthwise thereof adapted to be secured to a mounting surface lying substantially in a plane, a plurality of transverse fingers connected at one end with one longitudinal edge of the attaching portion and extending therefrom across the attaching portion beyond the opposite edge of said attaching portion and downward with bearing surfaces on the last-mentioned ends of the fingers in position to bear upon the mounting surface at said plane, and means for connecting said attaching portion to the mounting surface, said fingers having bearing portions intermediate the length thereof in position to bear upon another opposed surface under compression.

2. An electromagnetic shielding gasket according to claim 1, wherein the fingers are bowed and are joined by a reversely bent portion to an edge of the attaching portion of the strip.

3. An electromagnetic shielding gasket according to claim 1, wherein each of the transverse fingers is bowed substantially throughout the length thereof with a flat center portion in position for bearing relation with the opposed surface.

4. An electromagnetic shielding gasket comprising a linear metallic strip having an attaching portion extending lengthwise thereof, transverse fingers connected at one end with an edge of the attaching portion and extending therefrom in spaced relation adjacent to the opposite edge of said attaching portion with bearing surfaces on the last-mentioned ends of the fingers in position to bear upon a mounting surface, and means for connecting said attaching portion to the mounting surface comprising a pressure sensitive adhesive coating on the undersurface of the attaching portion of the strip, said fingers having bearing portions intermediate the length thereof in position to bear upon another opposed surface under compression.

5. An electromagnetic shielding gasket comprising a linear metallic strip having an attaching portion extending lengthwise thereof, transverse fingers connected at one end with an edge of the attaching portion and extending therefrom in spaced relation adjacent to the opposite edge of said attaching portion, and means for connecting said attaching portion to a mounting surface, said fingers being in position to be deflected by an opposed surface under compression, the connecting means comprising a tape adhesively secured to the undersurface of the attaching portion and having one adhesive surface in position for securing the strip to the mounting surface.

6. An electromagnetic shielding gasket according to claim 5, wherein the attaching portion has a continuous surface, and the connecting means comprises a continuous strip of tape having a coating of adhesive on opposite sides thereof one of which secures the tape to the surface of the attaching portion and the other adhesive coating is for securing the tape and gasket to a mounting surface.

7. An electromagnetic shielding gasket comprising a linear metallic strip notched at one edge to provide fingers thereon, each of the fingers being joined by a reverse bend with the edge of the strip and extending therefrom in an arched relation over the strip to a point adjacent the opposite edge thereof and with a free end adjacent to the last-mentioned edge of the strip and spaced therefrom, said reversely bent portions of the fingers and the free ends thereof being in positions for engagement with said mounting surface when the adhesive surface is secured thereto and pressure applied to the arched portion of the fingers, and a strip of tape adhesively secured to the undersurface of the metallic strip and having an opposite adhesive surface for securing the gasket to a mounting surface.

References Cited

UNITED STATES PATENTS 2,825,042  2/1958  Tollefson et al.
2,844,644  7/1958  Soule.
3,277,230  10/1966  Stickney et al.

OTHER REFERENCES

"Suppressing Radio Interference With Metex Shielding Products," Metal Textile Corp., Roselle, N.J., p. 15.

DARRELL L. CLAY, Primary Examiner

U.S. Cl. X.R.

277—236